Aug. 14, 1956 S. F. KOENIG 2,758,664
BI-DIRECTIONAL DRAIN VALVE
Filed June 24, 1952
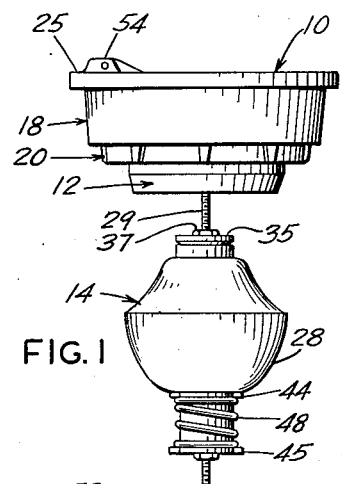
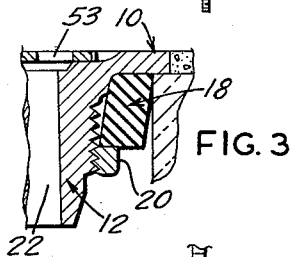
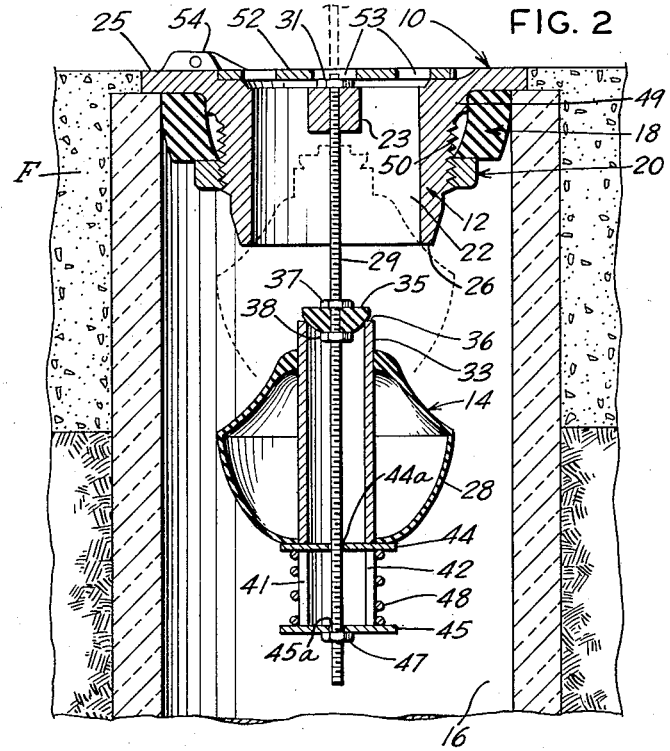
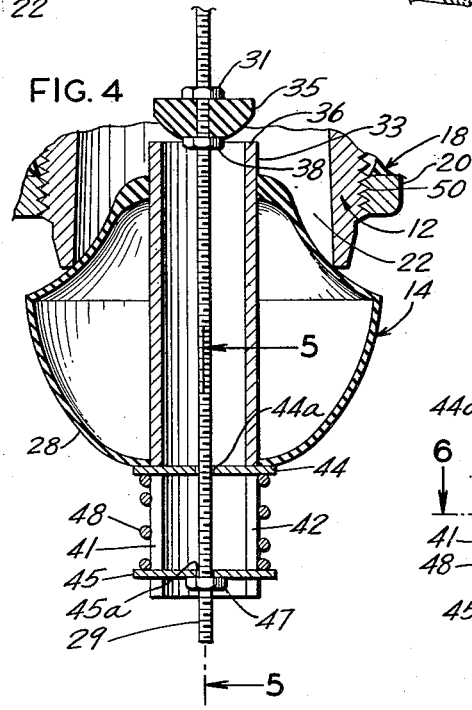
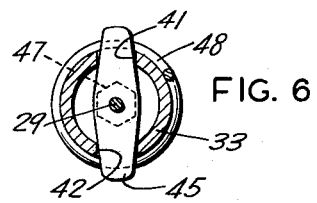
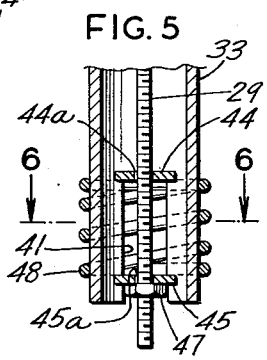
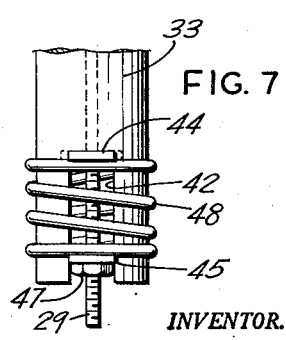
INVENTOR.
STEVEN F. KOENIG
BY Daniel V. O'Keeffe
ATTORNEY United States Patent Office 2,758,664
Patented Aug. 14, 1956

2,758,664

BI-DIRECTIONAL DRAIN VALVE

Steven F. Koenig, McHenry, Ill., assignor of one-half to Robert S. Mehr, McHenry, Ill.

Application June 24, 1952, Serial No. 295,229

7 Claims. (Cl. 182—25)

This invention relates to valves and more particularly to check valves of the type especially well adapted for use in drains to prevent back-flow from sewers.

A primary object of my invention is to afford a novel valve which is effective and efficient in preventing back-flow from sewers, and the like.

Another object of my invention is to afford a novel valve of the aforementioned type which may be quickly and easily installed in a novel and expeditious manner in presently existing drains, and which when so installed, is firmly held therein.

A further object is to enable a novel valve of the aforementioned type to be so constructed that in the event of the build-up of excessive pressure in a sewer, or the like, the valve will automatically open to relieve such pressure and will automatically close when the pressure again drops to within normal limits.

Yet another object of my invention is to provide a valve of the aforementioned type which is compact in size, strongly constructed, and efficient in operation, and which may be readily and economically produced commercially.

Other and further objects of the present invention will be apparent from the following description and claims and are illustrated in the accompanying drawing which, by way of illustration shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawing:

Fig. 1 is a side elevational view of a valve embodying the principles of my invention;

Fig. 2 is a longitudinal sectional view of the valve shown in Fig. 1, showing the valve mounted in a drain or sewer member;

Fig. 3 is a detail sectional view of a portion of the valve shown in Fig. 2, with certain parts disposed in different positions;

Fig. 4 is a detail sectional view of the valve shown in Fig. 2 with parts of the valve disposed in different positions;

Fig. 5 is a detail sectional view taken substantially along the line of 5—5 in Fig. 4;

Fig. 6 is a detail sectional view taken substantially along the lines 6—6 in Fig. 5; and Fig. 7 is a detail elevational view looking in the same direction as Fig. 5.

For the purpose of illustrating my invention, a valve 10 is shown in the drawings, which embodies the principles of my invention.

The novel valve 10 comprises, in general, Figs. 1 and 2, a substantially cylindrical shaped body member 12 from which depends a float valve 14 which is movable into and out of valve-closing relation to the body member 12, and which body member 12 and float valve 14 are adapted to be mounted in a suitable drain 16, shown in Fig. 2, and, when so mounted in the drain 16 may be effectively but releasably secured in position by means of a ring 18 and a nut 20 mounted on the body member 12, all of which will be discussed in greater detail hereinafter.

The body member 12 is preferably made of cast aluminum, or the like, and has a substantially smooth bore or passageway 22 extending longitudinally therethrough. A strap member 23, which preferably is formed as an integral part of the body member 12, extends diametrically across the passageway 22 at the upper end of the body member 12, Fig. 2. The upper end of the body member 12 is flared outwardly to afford an outwardly projecting flange or collar 25, and the lower end of the body member 12 affords a valve seat 26 for the float valve 14.

The float valve 14 includes a float 28 mounted on the lower end portion of a float valve stem 29, the upper end portion of which valve stem 29 projects through the strap 23 and is slidably mounted therein. The outer surface of the valve stem 29 is preferably threaded throughout its length, and a nut 31 mounted on the upper end portion of the valve stem 29 normally rests on the upper surface of the strap 23 to thereby support the valve stem 29 and float 28 in depending relation to the strap 23 on the body member 12, the valve stem 29 projecting through the bore 22.

The float 28 may be made of any suitable material such as, for example, rubber; and may be formed in any desirable shape such as, for example, the shape shown in the drawings. The float 28 is firmly mounted on a tubular member 33, made of suitable material such as aluminum, and is preferably molded directly onto the tubular member 33 so as to afford a water-tight connection therebetween but it will be appreciated by those skilled in the art that if desired the float 28 may be secured to the tubular member 33 by other suitable means such as, for example, a suitable adhesive.

A substantially disc-shaped valve member 35 is mounted on the valve stem 29 above the tubular member 33 and is adjustably secured in position on the valve stem 29 by two nuts 37 and 38 mounted on the valve stem 29 above and below the valve member 35, respectively, in clamping engagement with the latter. The positions of the valve member 35 on the valve stem 29 may be adjusted longitudinally of the valve stem 20 by adjustment of the nuts 37 and 38 upwardly or downwardly relative to the valve stem 29. In operation, the valve member 35 of my novel valve 10 is disposed in such position on the valve stem 29 that when the valve stem 29 and the tubular member 33 are disposed in the normal position shown in Fig. 2, the valve member 35 is seated against the upper end 36 of the tubular member 33 to thereby close the latter.

The lower end portion of the tubular member 33 has two diametrically disposed, downwardly opening, elongated slots 41 and 42 formed therein, Figs. 2, 5 and 7, and two cross bars 44 and 45 are mounted in the slots 41 and 42 and extend diametrically across the tubular member 33 in substantially parallel spaced relation to each other. The valve stem 29 extends through centrally disposed openings 44a and 45a in the cross bars 44 and 45, respectively, Figs. 4 and 5, and the openings 44a and 45a are sufficiently large to permit free movement of the cross bars 44 and 45 on the valve stem 29. A nut 47 is mounted on the valve stem 29 below the cross bar 45, in engagement with the latter, and a compression coil spring 48 is disposed around the lower end portion of the tubular member 33 between the cross bars 44 and 45 and yieldingly urges the cross bars 44 and 45 away from each other to thereby hold the cross bars 44 and 45 in spaced relation to each other. The cross bar 44 is held by the spring 48 upwardly against the closed upper end portion of the slots 41 and 42, and the cross bar 45 is held by the spring 48 downwardly against the nut 47. Thus, it will be seen that the spring 48, through its downward urging on the cross bar 45 and its upward urging on the cross bar 44, urges the valve stem 29 and the tubular member 33 downwardly and upwardly, respectively, relative to each other to thereby urge the valve member 35 toward engagement with the valve seat 36.

The cross bar 44 is preferably so disposed relative to the float 28 that when the cross bar 44 is disposed in the aforementioned normal position it is disposed in engagement with the lower portion of the float 28 and affords additional support therefor.

The valve 35 and its associated mechanism just referred to affords an automatically acting relief valve whereby if the pressure below the float 28, when the float 28 is disposed in closed position against the valve seat 26 as shown in Fig. 4, builds up to an excessively high pressure wherein the upward pressure on the valve 35 is sufficient to overcome the downwardly acting force of the spring 48 on the cross bar 45, the valve 35 and the valve stem 29 are raised relative to the tubular member 33 by such pressure against the action of the spring 48 to thereby afford a vent passageway through the float 28 and permit the venting of the drain from below the valve 28 upwardly through the float to the atmosphere to thereby relieve such excessive pressure.

As is best seen in Fig. 2, an outwardly projecting shoulder 49 is formed on the body member 12 directly below the collar member 25. Between the shoulder 49 and the valve seat 26 on the body member 12, screw threads 50 are formed on the outer surface of the body member 12. When my novel valve 10 is in assembled condition, the nut 20 is operatively engaged with the threads 50 and the annular ring 18 is disposed on the body member 12 between the collar 25 and the nut 20, as best seen in Fig. 2.

The resilient annular ring 18 may be made of any suitable material such as, for example, rubber, and, in the operation of my novel valve 10, is clamped between the collar 25 and the nut 20 as will be discussed in greater detail presently.

A drain plate or screen 52, having a plurality of openings 53 therein, is pivotally mounted by a hinge 54 on the upper end portion of the body member 12 and extends across the upper end of the passageway 22 in the body member 12. One of the openings 53 in the drain plate 52 is disposed in axial alignment with the valve stem 29, when the drain plate 52 is disposed in closed position, and is of sufficient size that the nut 31 and the valve stem 29 may be moved axially upwardly and downwardly therethrough during the operation of the valve 10.

In Fig. 2 of the drawings the valve 10 is shown mounted in a drain pipe 16 disposed in a concrete floor F. It will be understood, of course, that this is merely by way of illustration and that my novel valve 10 may be mounted in other locations such as, for example, in other types of drains or sewer lines without departing from the purview of my invention.

In a typical installation of my valve 10, such as is illustrated in the drawings, the float valve 14 and the lower end portion of the body member 12, with the annular ring 18 and the nut 20 mounted on the latter, is inserted downwardly into the drain pipe 16 and is preferably disposed in position wherein the collar 25 rests on a suitable supporting surface such as the upper end of the drain pipe 16. During the insertion of the valve 10 into such position in the drain pipe 16, the nut 20 and the ring 18 are loosely mounted on the body member 12, Fig. 3, so as not to compress the ring 18 between the collar 25 and the nut 20.

After the valve 10 has been inserted into proper position in the drain pipe 16, the nut 20 may then be advanced upwardly along the threads 50 toward the collar 25 to thereby firmly clamp the ring 18 between the collar 25 and the nut 20 which is effective to deform the ring 18 outwardly and thereby press it into firm, frictional holding engagement with the inner surface of the drain pipe 16 which is effective to hold the valve 10 in position in the pipe 16 against ejection therefrom. I have found that with the nut 20 advanced to the proper position on the body member 12, the frictional engagement effected between the ring 18 and the pipe 16 is more than sufficient to effectively hold the valve 10 in a drain against any normal pressures to which it is intended to be subjected.

The relative rotation of the nut 20 and the body member 12, necessary to advance the nut 20 toward the collar 25 may be readily accomplished in my novel device by grasping the strap 23 in the hand and manually rotating the body member 12. During the initial rotation of the body member 12 the operator may force the valve 10 laterally a slight amount to thereby press the ring 18 into frictional engagement with the pipe 16 to thereby hold the ring 18 against rotation. The ring 18 rests on the nut 20 and the frictional engagement between the nut 20 and the non-rotating ring 18 is sufficient to also hold the nut 20 against rotation, whereby the rotation of the body member 12 is effective to advance the nut 20 toward the collar 25. As the clamping force of the collar 25 and the nut 20 increases on the ring 18, it becomes unnecessary for the operator to manually press the ring 18 laterally into engagement with the pipe 16, the outward expansion of the ring 18 effected by the clamping of the ring 18 between the collar 25 and the nut 20 being sufficient to hold the ring 18 in proper frictional engagement with the pipe 16.

As is best seen in Fig. 2, when the ring 18 is disposed in normal holding position, wherein it is clamped between the collar 25 and the nut 20, the upper peripheral edge portion thereof is disposed in overlying relation to the shoulder 49 and is held outwardly thereby. The nut 20, at such time, is engaged with the inner portion of the lower edge of the ring 18, and it will be seen that, with the ring 18 tightly clamped in such position between the collar 25 and the nut 20, the ring 18 is effectively pressed outwardly into firm frictional engagement with the side wall of the pipe 16.

Removal of the valve 10 from an operative position such as shown in Fig. 2 may be readily accomplished by rotating the body member 12 in the opposite direction thereby moving the nut 20 downwardly on the threads 50 to release the compression of the ring 18 and permit the valve 10 to be raised from the pipe 16. In some instances, it may be necessary to unscrew the nut 20 a sufficient distance that during the removal operation, the ring 18 may ride downwardly from the shoulder 49 to permit the ring 18 to move inwardly sufficiently far to permit ready removal of the valve 10 from the pipe 16.

When the valve 10 is disposed in operative position in the pipe 16 the float valve 14 is normally disposed in the downwardly disposed position shown in solid lines in Fig. 2, wherein the float 28 is spaced from the valve seat 26. With the float 28 disposed in this position, it will be apparent that water or other drainage may pass downwardly through the openings 53 and the passageway 22, and may then pass downwardly around the float 28 through the pipe 16. However, in the event that water rises or backs up in the sewer to a level whereat, if the pipe 16 were left open, the water would flow out through the pipe 16 onto the floor F, as sometimes occurs during heavy rain storms and the like, the water thus rising in the pipe 16 is effective to raise the float valve 14 upwardly into the position shown in broken lines in Fig. 2 to thereby seat the float 28 against the valve seat 26 and close the passageway 22 of the body member 12 and thereby seal the upper end portion of the pipe 16.

In some instances under such flood conditions the upward surge of the water in the pipe 16 is sufficiently rapid that if it were stopped instantly, the initial force on the valve 10 and, in fact, on the floor F might be excessive. Therefore, in order to guard against such a sudden application of pressure on the valve 10 and to guard against the building up of excessive pressures in the pipe 16, I have afforded in my novel valve 10 a relief valve so that when pressures below the float 28 exceed a predetermined safe pressure the pressure on the lower surface on the valve 35 is sufficient to raise the valve 35 away from its seat 36 on the tubular member 33 as shown in Fig. 4, to thereby afford a vent through the tube 33 through which water or the like may pass to relieve the excessive pressure below the float 28. When the pressure below the float 28 again drops to within the predetermined safe limits, the spring 48 is effective to again seat the valve 35 on the valve seat 36 and thereby close the passageway through the tubular member 33. Adjustment of the pressure at which the valve 35 will release may be readily effected by adjustment of the position of the nut 47 on the valve stem 29 to thereby adjust the effective force of the spring 48 acting on and between the cross bars 44 and 45.

From the foregoing it will be seen that I have afforded a novel valve which constitutes an effective device for preventing flooded sewers from causing flooding through reverse flow of water through drains.

Also it will be seen that I have provided a novel valve of the aforementioned type wherein the parts thereof are constituted and arranged, and cooperate, in a novel and expeditious manner.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A valve of the type adapted to be mounted in drainpipes for automatically controlling the opening and closing of the latter and comprising an annular body member, a float valve including a float and elongated means mounted in said body member and attached to the central portion of said float to thereby support said float from said body member in depending relation thereto, said float valve being slidably mounted in said body member for movement upwardly and downwardly relative thereto to thereby move said float into and out of seating relation to the lower opening of said annular body member, said float valve including pressure responsive valve means operable to open and thereby vent such a drain-pipe to the atmosphere when the pressure in said drain-pipe below said float valve exceeds a predetermined pressure, said valve means comprising a sleeve mounted in said float and having a passageway therethrough, a valve member movably mounted in said passageway and movable by said predetermined pressure to thereby open said passageway, and spring means connected to said valve and said valve member in position to normally yieldingly hold said valve member in position to close said passageway, and means on said annular body member for mounting said body member and said float valve in such a drain-pipe.

2. The invention defined in claim 1 and in which said means for mounting said body member and said float valve in the drain pipe comprises an outwardly projecting flange on said body member, a resilient ring mounted on said body member in encircling relation thereto below said flange, and a clamping ring mounted on said body member and threadedly engaged therewith on the other side of said resilient ring from said flange and movable toward said flange for clamping said resilient ring between said flange and said clamping ring to thereby expand said resilient ring outwardly.

3. A valve for closing drain-pipes for water comprising a body member having a passageway therethrough, valve means mounted on said body member for opening and closing said passageway, and means for mounting said body member and said valve means in the upper end portion of such a drain-pipe, said last named means comprising outwardly projecting means on said body member, a resilient annular member mounted on said body member in encircling relation thereto, and a clamping ring mounted on said body member in encircling relation thereto below said outwardly, projecting means and threadedly engaged with said body member for movement toward and away from said outwardly projecting means when said body member is disposed in normal position in such a drain pipe, said clamping ring being mounted on the opposite side of said resilient annular member from said outwardly projecting means whereby said clamping ring is effective to press said resilient annular member against said last mentioned means upon movement towards the latter and thereby expand said resilient member outwardly.

4. A valve as defined in claim 3 and in which said outwardly projecting means comprises a flange projecting outwardly from said body member, and a shoulder projecting outwardly from said body member below said flange, and in which said resilient member is movable upwardly onto said shoulder into engagement with said flange, and in which said clamping ring is mounted below said resilient member and is movable along said body member into position to clamp said resilient member against said flange in overlying relation to said shoulder.

5. A valve for drain-pipes comprising an annular body member having an upper and lower opening, a valve rod slidably mounted in said body member and extending through said lower opening, a float, means for mounting said float on said valve rod, said means comprising a tubular member mounted in said float in encircling relation to said valve rod, a valve member mounted on said valve rod above said tubular member and normally disposed against said tubular member in position to close the passageway therethrough, an abutment member mounted on said valve rod below said float, and a compression coil spring mounted around said valve rod between said float and said abutment member and connected at its upper end to said tubular member in position to yieldingly urge said float and tubular member upwardly relative to said valve rod and thereby urge said valve member into said passageway-closing position relative to said tubular member, said float, said tubular member, said valve member, and said valve rod being movable upwardly as a unit from normal position, wherein said float is disposed in spaced relation to said body member, into a raised position in which said float is disposed in seating relation to said lower opening in said body member to thereby close said lower opening, and means mounted on the outside of said body member for releasably holding said body member in such a drain-pipe.

6. The invention defined in claim 5 and in which said means for releasably holding said body member comprises an outwardly projecting flange on said body member, a shoulder projecting outwardly from said body member below said flange, a clamping ring mounted on said body member below said shoulder and movable toward and away from said flange, and a resilient annular member having a top face engaged with said flange, an inner upper peripheral edge portion mounted on said shoulder, and a lower face having an inner peripheral edge portion disposed in engagement with said clamping ring, said clamping ring being effective when moved toward said flange to press said resilient annular member against said flange and thereby deform the latter outwardly.

7. A valve of the type adapted to be mounted in drainpipes for controlling the opening and closing of the latter and comprising an annular body member, a float valve including a float and elongated means mounted in said body member and attached to the central portion of said float to thereby support said float from said body member in depending relation thereto, said float valve being slidably mounted in said body member for movement upwardly and downwardly relative thereto to thereby move said float into and out of seating relation to the lower opening of said annular body member, said float valve including pressure responsive valve means operable to open and thereby vent such a drain-pipe to the atmosphere when the pressure in said drain-pipe below said float valve exceeds a predetermined pressure, said valve means comprising a tubular member having an upper end portion and a lower end portion, a valve member normally mounted on said upper end portion of said tubular member in position to close the passageway through the latter, said valve member being movable upwardly away from said upper end portion of said tubular member to thereby open said last mentioned passageway when the pressure below said float valve exceeds said predetermined pressure, and spring means connected to said valve member and yieldingly urging the latter toward said normal position, and means on said annular body member for mounting said body member and said float valve in such a drainpipe.

References Cited in the file of this patent

UNITED STATES PATENTS

| | | |
|---|---|---|
| 215,238 | Philow et al. | May 13, 1879 |
| 433,618 | Cunningham | Aug. 5, 1890 |
| 526,177 | Blair | Sept. 18, 1894 |
| 1,139,130 | McKeown | May 11, 1915 |
| 1,721,746 | Pearson | July 23, 1929 |
| 1,753,724 | Shaw | Apr. 8, 1930 |
| 2,524,501 | Wilhelm | Oct. 3, 1950 |
| 2,615,676 | Neubauer | Oct. 28, 1952 |

FOREIGN PATENTS

| | | |
|---|---|---|
| 13,542 | Belgium | 1925 |
| 808,769 | France | Nov. 24, 1936 |